(12) United States Patent
Ebisu

(10) Patent No.: US 9,151,218 B2
(45) Date of Patent: Oct. 6, 2015

(54) VARIABLE CAPACITY EXHAUST GAS TURBOCHARGER

(75) Inventor: Motoki Ebisu, Sagamihara (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 408 days.

(21) Appl. No.: 13/146,668

(22) PCT Filed: Sep. 25, 2009

(86) PCT No.: PCT/JP2009/066651
§ 371 (c)(1),
(2), (4) Date: Aug. 25, 2011

(87) PCT Pub. No.: WO2010/097981
PCT Pub. Date: Sep. 2, 2010

(65) Prior Publication Data
US 2011/0296835 A1 Dec. 8, 2011

(30) Foreign Application Priority Data
Feb. 27, 2009 (JP) .................................. 2009-047410

(51) Int. Cl.
*F02D 23/00* (2006.01)
*F02B 37/12* (2006.01)
(Continued)

(52) U.S. Cl.
CPC ............... *F02B 37/22* (2013.01); *F02B 37/025* (2013.01); *Y02T 10/144* (2013.01)

(58) Field of Classification Search
CPC ........ F02B 37/18; F02B 37/00; F02B 37/025; F02B 37/22; Y02T 10/144
USPC ..................... 60/602; 415/164, 151, 123, 205
IPC .............................................. F02B 37/12, 39/00
See application file for complete search history.

(56) References Cited

U.S. PATENT DOCUMENTS 94,868 A * 9/1869 Chase ........................... 415/123
228,629 A * 6/1880 Hacheney ..................... 415/184
(Continued)

FOREIGN PATENT DOCUMENTS

EP 0 208 248 A1 1/1987
FR 2780445 A1 * 12/1999 .............. F02B 37/12
(Continued)

OTHER PUBLICATIONS

Machine translation of the reference to Adachi Kazunari et al. (Pub. No. JP 2002-138845 A), published on May 17, 2002.*
(Continued)

*Primary Examiner* — Thai Ba Trieu
(74) *Attorney, Agent, or Firm* — Birch, Stewart, Kolasch & Birch, LLP

(57) ABSTRACT

A variable capacity exhaust gas turbocharger having a small thermal capacity and enabling the structure to be simplified. A exhaust gas inlet hardware (13) having an exhaust gas inlet body (11) in which an inner side flow passage (U1) communicating with an inner scroll passage (T1) and an outer side flow passage (U2) communicating with an outer scroll flow passage (T2) are formed and a flap valve (12) for opening and closing the outer side flow passage (U2) are formed at the exhaust gas inlet part of a turbine housing body (14) in which the inner scroll passage (T1) and the outer scroll flow passage (T2) are formed. A valve recess (11a) for disposing the flap valve (12) along the outer side flow passage (U2) and a seat (11b) for the flap valve for closing the outer side flow passage (U2) are formed in the exhaust gas inlet body (11). The flap valve (12) is rotatable about a rotating center positioned in the storage space of the valve recess (11a) between the position of the flap valve in contact with the seat (11b) and the position of the flap valve stored in the valve recess (11a).

7 Claims, 9 Drawing Sheets

(51) Int. Cl.
*F01D 17/12* (2006.01)
*F04D 29/44* (2006.01)
*F04D 29/54* (2006.01)
*F02B 37/22* (2006.01)
*F02B 37/02* (2006.01)

(56) References Cited

U.S. PATENT DOCUMENTS

| | | | |
|---|---|---|---|
| 2,860,827 A | 11/1958 | Egli | |
| 3,137,477 A * | 6/1964 | Siegfried | 415/205 |
| 3,383,092 A * | 5/1968 | Cazier | 415/205 |
| 3,552,876 A * | 1/1971 | Updike | 415/205 |
| 3,614,259 A * | 10/1971 | Neff | 60/602 |
| 4,389,845 A * | 6/1983 | Koike | 60/602 |
| 4,544,326 A * | 10/1985 | Nishiguchi et al. | 60/602 |
| 4,565,068 A | 1/1986 | Schneider | |
| 4,689,959 A * | 9/1987 | Houkita et al. | 60/602 |
| 4,745,752 A * | 5/1988 | Suzuki | 60/602 |
| 4,745,753 A * | 5/1988 | Tadokoro et al. | 60/602 |
| 4,894,990 A * | 1/1990 | Tsubouchi | 60/602 |
| 6,073,447 A | 6/2000 | Kawakami et al. | 60/602 |
| 6,941,755 B2 * | 9/2005 | Bucknell et al. | 60/602 |
| 7,694,518 B2 * | 4/2010 | Whiting et al. | 60/602 |
| 2008/0223956 A1 | 9/2008 | Jinnai et al. | |
| 2009/0151348 A1 | 6/2009 | Hayashi et al. | |
| 2011/0041333 A1* | 2/2011 | Ebisu et al. | 29/889.2 |
| 2011/0085891 A1* | 4/2011 | Matsuo | 415/151 |
| 2012/0060494 A1* | 3/2012 | Sato et al. | 60/602 |
| 2014/0093364 A1* | 4/2014 | Narehood et al. | 415/191 |
| 2014/0123966 A1* | 5/2014 | Ide et al. | 123/568.21 |

FOREIGN PATENT DOCUMENTS

| | | | | |
|---|---|---|---|---|
| GB | 1 044 176 A | | 9/1966 | |
| JP | 57-114134 | | 7/1982 | |
| JP | 58-172427 A | | 10/1983 | |
| JP | 59-138727 A | | 8/1984 | |
| JP | 61160526 A | * | 7/1986 | F02B 37/12 |
| JP | 61-137850 U | | 8/1986 | |
| JP | 61175239 A | * | 8/1986 | F02B 37/12 |
| JP | 61190122 A | * | 8/1986 | F02B 37/12 |
| JP | 62-7934 A | | 1/1987 | |
| JP | 62-78434 A | | 4/1987 | |
| JP | 62126224 A | * | 6/1987 | F02B 37/12 |
| JP | 62131923 A | * | 6/1987 | F02B 37/12 |
| JP | 62223419 A | * | 10/1987 | F02B 37/12 |
| JP | 63021326 A | * | 1/1988 | F02B 37/12 |
| JP | 63215829 A | * | 9/1988 | F02B 37/12 |
| JP | 01092531 A | * | 4/1989 | F02B 37/12 |
| JP | 2000008868 A | * | 1/2000 | F02B 37/12 |
| JP | 2001-263080 A | | 9/2001 | |
| JP | 2002-138845 A | | 5/2002 | |
| JP | 2003120302 A | * | 4/2003 | F02B 37/02 |
| JP | 2007-120396 A | | 5/2007 | |
| JP | 2007192128 A | * | 8/2007 | F02B 37/12 |
| JP | 2008-128065 A | | 6/2008 | |
| JP | 2008-215083 A | | 9/2008 | |

OTHER PUBLICATIONS

Machine tranlation of the reference to Akita Koichi et al. (Pub. No. JP 2007-120396 A), published on May 17, 2007.*
Decision to Grant a Patent for Japanese Application No. 2009-047410, dated Jan. 8, 2013 with English translation.
Notice of Allowance for Korean Application No. 10-2011-7018470, dated Jun. 13, 2013 with English translation.
Japanese Office Action for corresponding Japanese Application No. 2009-047410 mailed Aug. 30, 2012 with English translation.
Chinese Office Action dated Dec. 5, 2012 issued in the corresponding Chinese patent application No. 200980156456.4.
Notice of Allowance dated Dec. 3, 2013 issued in the corresponding Chinese Application No. 200980156456.4 with an English translation.
European Search Report dated Jul. 17, 2014 issued in corresponding EP Application No. 09840828.9.

* cited by examiner

When the engine is operated under low speed

When the engine is operated under high speed

VARIABLE CAPACITY EXHAUST GAS TURBOCHARGER

BACKGROUND OF THE INVENTION

1. Field of the Invention

The present invention relates to a variable capacity exhaust gas turbocharger provided with an inner scroll gas passage and an outer scroll gas passage.

2. Background of the Invention

An exhaust gas turbocharger of a relatively small size is used for an internal combustion engine of vehicle use; the exhaust gas turbocharger is provided with a scroll passage is conventionally used; thereby, the exhaust gas emitted by the engine is charged into the scroll passage that is formed in a turbine housing in which a plurality of nozzle vanes is arranged on the inner periphery side of the scroll passage; after passing through the nozzle vanes, the exhaust gas works on the turbine rotor that is provided inside of the circumference formed by the nozzle vanes. Such a turbocharger of a variable capacity type (a variable nozzle area type) as well as of a radial gas-flow type finds widespread acceptance (see the patent references 1 and 3, for instance).

FIG. 8 depicts a general example of conventional exhaust gas turbochargers of a variable capacity type (having an inner scroll passage and an outer scroll passage); thereby, FIG. 8 shows a bird' eye view regarding the variable capacity exhaust gas turbocharger of a conventional type, the turbocharger being depicted by use of an exploded view. As shown in FIG. 8, the turbocharger is provided with: a turbine housing 1; a bearing housing unit 5 coupled to the turbine housing 1; and, a compressor housing 2 coupled to the bearing housing unit 5. Further, in the space that involves the bearing housing unit 5 and the turbine housing 1, a turbine wheel 3 and a turbine stator 4 are housed; incidentally, a compressor wheel is provided in the turbocharger (in the compressor housing) in response to the turbine wheel, although the compressor wheel is not shown. An opening is formed on an upper side of the turbine housing 1; a valve cover 7 is fastened to the turbine housing so as to cover the opening with a gasket 6 between the valve cover 7 and the turbine housing; just below the valve cover, a flow rate control valve 8 is arranged inside the turbine housing 1. The turbine housing 1 is provided with a plate type inlet flange 1a that is formed so as to fix the turbine housing 1 to an exhaust gas outlet side of the engine.

When the turbocharger which exploded view is depicted in FIG. 8 is assembled and the turbocharger-mounted engine is operated under a low speed operation condition, the exhaust gas enters an gas inlet opening inside of the plate type inlet flange 1a (enters the exhaust gas inlet opening of the turbocharger) and the exhaust gas streams along an inner scroll passage T1 that forms a spiral shape passage, as shown in FIG. 9(a); thereby, the streamlines of the exhaust gas flow along the inner scroll passage are directed toward the inner side of the spiral scroll. Further, the turbine housing comprises an outer scroll passage T2 beside the inner scroll passage T1; the inner scroll passage T1 and the outer scroll passage T2 are demarcated by a plurality of blades 4a of a turbine stator; since the stream lines of the exhaust gas flow along the inner scroll passage are directed toward the inner side of the spiral scroll, the exhaust gas flow in the inner scroll passage T1 does not enter the outer scroll passage T2.

On the other hand, when the engine is operated under a high-speed operation condition, a flow rate control valve 8 is pivotally rotated so as to move toward a valve cover 7 as shown in FIG. 9(b); thus, the exhaust gas that enters the turbocharger (the gas inlet opening inside of the plate type inlet flange 1a) streams along the inner scroll passage T1 as well as the outer scroll passage T2. In such a manner as shown in FIG. 9(a), the exhaust gas that enters the inner scroll passage T1 streams along the inner scroll passage T1, the streamlines being directed toward the inner side of the spiral scroll. On the other hand, the exhaust gas that enters the outer scroll passage T2 streams along the spiral of the outer scroll passage T2; and, the exhaust gas streams into the inner scroll passage through the slit area (or the throat area) between a blade 4a of the turbine stator and an adjacent blade; thus, the exhaust gas flow in the outer scroll passage joins the exhaust gas flow in the inner scroll passage. Thus, a merging gas flow is formed and streams toward the turbine wheel; then, after passing by the turbine wheel, the exhaust gas is discharged outside of the turbine housing 1.

Incidentally, when the engine is operated under the low speed operation condition as depicted in FIG. 9(a), the exhaust gas streams only in the inner scroll passage T1; thus, the exhaust gas flow speed under the low speed operation condition is faster than that under the high speed operation condition. On the other hand, when the engine is operated under the high speed operation condition as depicted in FIG. 9(b), the exhaust gas streams in and along the inner scroll passage T1 as well as the outer scroll passage T2; thus, the back pressure regarding the exhaust gas flow is reduced and the fuel consumption is improved.

However, in the variable capacity exhaust gas turbocharger of conventional technologies, there exist the components such as the turbine stator 4, the flow rate control valve 8 and the valve cover; accordingly, the heat capacity (or heat accumulation) regarding the components that form the turbine housing assembly becomes large; thus, the components forming the turbine housing assembly absorb large heat quantity during an engine start transition condition, namely, during a time interval from the time point of the engine start in a cold condition to the time point of the temperature distribution stabilization in a hot operating condition. Hence, it requires longer time for the temperature of the catalyst in the exhaust gas purifying device provided on a downstream side of the exhaust gas outlet of the turbine housing to reach the activation temperature regarding the catalyst. In this way, it is required that the heat capacity of the components that form the turbine housing assembly be reduced. In order to enhance the purifying efficiency, it is preferable to reduce the heat capacity of the turbine housing assembly as small as possible.

Further, the configuration in which the valve cover 7 is included is not preferable in view of costs, time and labor in packaging, and possible gas leakage and so on.

REFERENCES

Patent References

Patent Reference 1: JP2008-128056
Patent Reference 2: JP2008-215083
Patent Reference 3: U.S. Pat. No. 2,860,827

SUMMARY OF THE INVENTION

Subjects to be Solved

In view of the subjects that appears in the conventional technologies, the present invention aims at providing a variable capacity exhaust gas turbocharger, by which the heat capacity, namely, the heat absorption accumulated on the turbine side of the turbocharger is restrained, and the configuration of the turbocharger is simplified.

Means to Solve the Subjects

In order to provide solutions for the subjects, the present invention discloses a variable capacity exhaust gas turbocharger, comprising:
  a turbine housing in which exhaust gas emitted from an internal combustion engine is guided;
  a turbine wheel provided in the turbine housing, the turbine wheel being rotated by the exhaust gas;
  an inner scroll passage and an outer scroll passage formed in the turbine housing for dividing a flow of the exhaust gas for rotating the turbine wheel into an inner flow and an outer flow;
  a flow rate control valve provided in the turbine housing for controlling a flow rate of the exhaust gas that enters the inner scroll passage and a flow rate of the exhaust gas that enters the outer scroll passage; and
  a compressor housing connected to the turbine housing via a bearing housing unit;
  wherein the flow rate control valve is a flap valve, and the variable capacity exhaust gas turbocharger further comprises:
  an exhaust gas inlet hardware provided in an exhaust gas inlet part of a turbine housing body inside of which the inner scroll passage and the outer scroll passage are formed, the exhaust gas inlet hardware including:
    an exhaust gas inlet body comprising an inner side flow passage that communicates with the inner scroll passage,
    an outer side flow passage that communicates with the outer scroll passage; and
    the flap valve that opens and closes the outer side flow passage;
  wherein
  the exhaust gas inlet body comprises:
    a valve recess for the flap valve to be placed therein along the outer side flow passage; and
    a seat on which the flap valve sit to shut off the outer side flow passage;
  further wherein the flap valve has a rotation center placed in a housing space of the valve recess; and
  the flap valve rotationally moves around the rotation center between a position where the flap valve is in contact with the seat and a position where the flap valve is housed in the valve recess.

According to the present invention as disclosed above, the rotation center of the flap valve is placed in the housing space of the valve recess; around the rotation center, the flap valve rotationally moves between a position where the flap valve keeps contact with the seat and a position where the flap valve is housed in the space of the valve recess; thus, the conventionally used valve cover can be dispensed with; accordingly, there can be no apprehension of gas leakage through the sealing surface of the valve cover; moreover, the configuration of the turbine assembly can be simplified and made compact, and the heat capacity of the components that form the turbine assembly can be reduced. Consequently, the time span during which the catalyst of the exhaust gas purifying device is activated can be shortened. Further, the flap valve is folded into the space of the valve recess, together with the arm member that is connected to the flap valve; thus, the flap valve does not hinder the exhaust gas flow. Accordingly, the pressure drop loss regarding the exhaust gas flow can be restrained, and the turbine efficiency can be enhanced.

Still further, since the components such as the valve cover, the gasket and the fitting bolts thereof can be dispensed with, the manufacturing cost can be reduced.

A preferable embodiment according to the present invention described above is the variable capacity exhaust gas turbocharger, wherein the exhaust gas inlet hardware is formed as a separated body from the turbine housing body, and fitted to an exhaust gas inlet side of the turbine housing body.

According to the embodiment of the present invention as disclosed above, since the exhaust gas inlet hardware is provided as a separated body different from the turbine housing body, the flap valve and an arm member connected to the flap valve can be easily assembled to the exhaust gas inlet hardware.

Another preferable embodiment according to the present invention as disclosed above is the variable capacity exhaust gas turbocharger, wherein the exhaust gas inlet hardware comprises a flange part, and a second seat for the flap valve to sit thereon, the second seat being formed on an inner-wall positioned at an inner periphery side of the flange part.

According to the embodiment of the present invention as described above, the second seat is formed at the inner periphery side of the flange part on the exhaust gas passage inner-wall of the exhaust gas inlet hardware; the second seat can supply satisfactory strength durability against the seating impacts of the flap valve, even though the flap valve repeats opening/closing movements for long operation hours. In addition, the exhaust gas flow passing through the outer scroll passage can be further accurately shut.

Further, the present invention discloses a variable capacity exhaust gas turbocharger, comprising:
  a turbine housing in which exhaust gas emitted from an internal combustion engine is guided;
  a turbine wheel provided in the turbine housing, the turbine wheel being rotated by the exhaust gas;
  an inner scroll passage and an outer scroll passage formed in the turbine housing for dividing a flow of the exhaust gas for rotating the turbine wheel into an inner flow and an outer flow;
  a flow rate control valve provided in the turbine housing for controlling a flow rate of the exhaust gas that enters the inner scroll passage and a flow rate of the exhaust gas that enters the outer scroll passage; and
  a compressor housing connected to the turbine housing via a bearing housing unit;
  wherein the flow rate control valve is a flap valve, and the variable capacity exhaust gas turbocharger further comprises:
  an exhaust gas inlet hardware provided at an exhaust gas inlet part of a turbine housing body inside of which the inner scroll passage and the outer scroll passage are formed, the exhaust gas inlet hardware comprising:
    an exhaust gas inlet duct into which the exhaust gas streams; and
    the flap valve provided to the exhaust gas inlet duct;
  wherein the gas inlet side of the turbine housing body is provided with a partition wall for separating between the inner scroll passage and the outer scroll passage,
  a seat on which the flap valve sits is formed on an end part of the partition wall at the side of the exhaust gas inlet part, and
  the flap valve rotationally moves between a position where the flap valve is in contact with the seat and a position where the flap valve is placed along the gas flow direction, further wherein when the flap valve is placed along the gas flow direction, the flap valve moves into a space outside of an area that is formed by the extension of the exhaust gas inlet duct so that the flap valve does not hinder the exhaust gas flow.

According to the present invention as disclosed above, since the flap valve rotationally moves between a position where the flap valve sits on the seat of the partition wall and a position where the flap valve is placed along the gas flow direction, the conventionally used valve cover can be dispensed with; accordingly, there can be no apprehension of gas leakage through the sealing surface of the valve cover; moreover, the configuration of the turbine assembly can be simplified and made compact, and the heat capacity of the components that form the turbine assembly can be reduced. Consequently, the time span during which the catalyst of the exhaust gas purifying device is activated can be shortened. Further, when the engine is operated under a high speed operation condition and the exhaust gas made stream through the outer scroll passage, the flap valve is placed along the gas flow direction; thus, the flap valve does not hinder the exhaust gas flow. More in detail, when the flap valve is placed along the gas flow direction, the flap valve moves into a space outside of an area that is formed by the extension of the exhaust gas inlet duct so that the flap valve does not hinder the exhaust gas flow. Accordingly, the pressure drop loss regarding the exhaust gas flow can be restrained, and the turbine efficiency can be enhanced. Still further, since the components such as the valve cover, the gasket and the fitting bolts thereof can be dispensed with, the manufacturing cost can be reduced.

A preferable embodiment according to the present invention as disclosed above is the variable capacity exhaust gas turbocharger, wherein the exhaust gas inlet duct is inserted in an exhaust gas inlet part of the turbine housing body, thereby forming a double tube structure.

According to the embodiment of the present invention as described above, the exhaust gas inlet duct is inserted in an outer duct as a gas inlet part of the turbine housing, so that the double tube structure is formed. Hereby, the exhaust gas can stream just inside the exhaust gas inlet duct as the inner side duct of the double tube structure; thus, an air space can be formed between the outer duct and the exhaust gas inlet duct as an inner duct. Thanks to the air space, excellent heat insulation can be achieved, namely, heat dissipation transmitted to the turbine housing can be reduced; the temperature of the exhaust gas can be kept high; and, the time span during which the catalyst of the exhaust gas purifying-device becomes activated can be shortened.

Another preferable embodiment according to the present invention as disclosed above is the variable capacity exhaust gas turbocharger, wherein the exhaust gas inlet duct is made of metal sheets.

According to the embodiment of the present invention as described above, the exhaust gas inlet duct is formed, being made of thin metal sheets; and, an outer duct as a gas inlet part of the turbine housing surrounds the exhaust gas inlet duct. Thus, the exhaust gas inlet duct and the gas inlet part of the turbine housing form a double tube structure; accordingly, the heat to be transmitted to the turbine housing can be reduced, and the temperature of the exhaust gas can be kept high. As a result, the time span during which the catalyst of the exhaust gas purifying-device becomes activated can be shortened.

Further, the present invention discloses a variable capacity exhaust gas turbocharger, comprising:
 a turbine housing in which exhaust gas emitted from an internal combustion engine is guided;
 a turbine wheel provided in the turbine housing, the turbine wheel being rotated by the exhaust gas;
 an inner scroll passage and an outer scroll passage formed in the turbine housing for dividing
 a flow of the exhaust gas for rotating the turbine wheel into an inner flow and an outer flow;
 a flow rate control valve provided in the turbine housing for controlling a flow rate of the exhaust gas that enters the inner scroll passage and a flow rate of the exhaust gas that enters the outer scroll passage; and
 a compressor housing connected to the turbine housing via a bearing housing unit;
 wherein the flow rate control valve is a butterfly valve,
 the butterfly valve is provided at the exhaust gas inlet part of the turbine housing body inside of which the inner scroll passage and the outer scroll passage are formed,
  the exhaust gas inlet part of the turbine housing body is provided with a partition wall for separating between the inner scroll passage and the outer scroll passage,
 a seat on which the butterfly valve sits is formed on an end part of the partition wall at the side of the exhaust gas inlet part, and
 the butterfly valve rotationally moves between a position where the butterfly valve sits on the seat and a position where the flap valve is placed along the gas flow direction.

According to the present invention as disclosed above, the butterfly valve rotationally moves between a position where the butterfly valve sits on the seat on the partition wall, and a position where the butterfly valve is placed along the gas flow direction; thus, the conventionally used valve cover can be dispensed with; accordingly, there can be no apprehension of gas leakage through the sealing surface of the valve cover; moreover, the configuration of the turbine assembly can be simplified and made compact, and the heat capacity of the components that form the turbine assembly can be reduced. Consequently, the time span during which the catalyst of the exhaust gas purifying device becomes activated can be shortened.

Further, since the butterfly valve can be placed along the gas flow direction so that the butterfly valve does not hinder the exhaust gas flow, the pressure drop loss regarding the exhaust gas flow can be restrained, and the turbine efficiency can be enhanced. Still further, since the components such as the valve cover, the gasket and the fitting bolts thereof can be dispensed with, the manufacturing cost can be reduced.

A preferable embodiment according to the present invention is the variable capacity exhaust gas turbocharger, comprising
 a flange part formed at the exhaust gas inlet part of the turbine housing body; and
 a second seat for the butterfly valve to sit thereon is formed at an inner periphery side of the flange part on an exhaust gas passage inner-wall of the exhaust gas inlet part of the turbine housing body.

According to the embodiment of the present invention as described above, a second seat is formed at the inner periphery side of the flange part on the exhaust gas passage inner-wall of the exhaust gas inlet part of the turbine housing body, so that the butterfly valve sits on the second seat. Therefore, the second seat can supply satisfactory strength durability against the seating impacts of the butterfly valve, even though the butterfly valve repeats opening/closing movements for long operation hours. In addition, the exhaust gas flow passing through the outer scroll passage can be further accurately shut.

Another preferable embodiment according to the present invention as disclosed above is the variable capacity exhaust gas turbocharger, wherein
the butterfly valve is configured to be installed from the exhaust gas inlet part of the turbine housing body.

According to the embodiment of the present invention as described above, the butterfly valve can be easily assembled in the turbine housing; thus, TACT time (e.g. inspection time) or manufacturing cost can be reduced.

Another preferable embodiment according to the present invention as disclosed above is the variable capacity exhaust gas turbocharger, wherein
the butterfly valve slopes so that the exhaust gas smoothly streams into the inner scroll passage when the butterfly valve sits on the seat on the partition wall.

According to the embodiment of the present invention as described above, when the butterfly valve sits on the seat on the partition wall, the butterfly valve slopes so that the exhaust gas smoothly streams into the inner scroll passage; thus, the pressure drop loss regarding the exhaust gas flow can be restrained.

Another preferable embodiment according to the present invention is the variable capacity exhaust gas turbocharger, wherein the flap valve or the butterfly valve has surface contact with the seat on the partition wall, when the flap valve or the butterfly valve sits on the seat.

According to the embodiment of the present invention as described above, the sealing effect during the valve closing duration is enhanced; thus, the exhaust gas streaming through the outer scroll passage is prevented from leaking into the inner scroll passage. Accordingly, the deterioration of the turbine performance is restrained while the flap valve or the butterfly valve sits on the seat Further, the exhaust gas can be prevented from streaming through the outer scroll passage; thus, heat dissipation loss can be restrained. Consequently, the heat capacity (heat accumulation capacity) of the turbine assembly can be reduced; moreover, the time span during which the catalyst of the exhaust gas purifying-device becomes activated can be shortened.

Another preferable embodiment according to the present invention is the variable capacity exhaust gas turbocharger, wherein the surface of the seat is grinded.

According to the embodiment of the present invention as described above, the surface of the seat on which the flap valve or the butterfly valve sits is grinded; thus, the sealing performance during the valve closing duration regarding each valve can be enhanced.

Another preferable embodiment according to the present invention is the variable capacity exhaust gas turbocharger, wherein the turbine housing body is made of metal sheets.

According to the embodiment of the present invention as described above, the turbine housing body is formed with metal sheets; the heat capacity of the turbine assembly can be reduced. Consequently, the time span during which the catalyst of the exhaust gas purifying device becomes activated can be shortened.

Effects of the Invention

The present invention can provide a variable capacity exhaust gas turbocharger; thereby, the heat capacity, namely, the heat absorption accumulated on the turbine side of the turbocharger can be restrained; and, the configuration of the turbocharger can be simplified.

BRIEF DESCRIPTION OF THE DRAWINGS

The present invention will now be described in greater detail with reference to the preferred embodiments of the invention and the accompanying drawings, wherein.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 8:
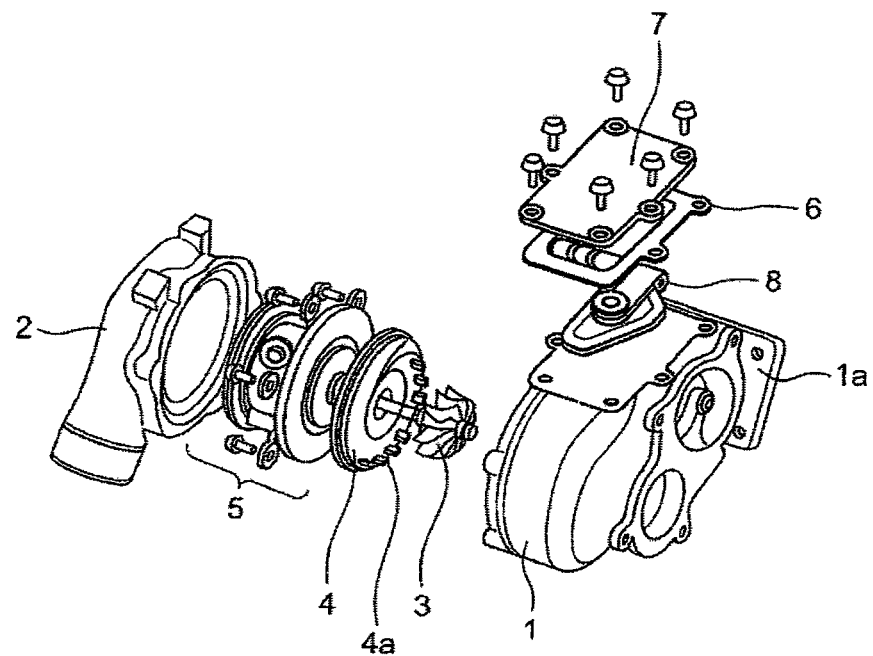
FIG. 8 explains a variable capacity exhaust gas turbocharger of a conventional type.
Figure 9A:
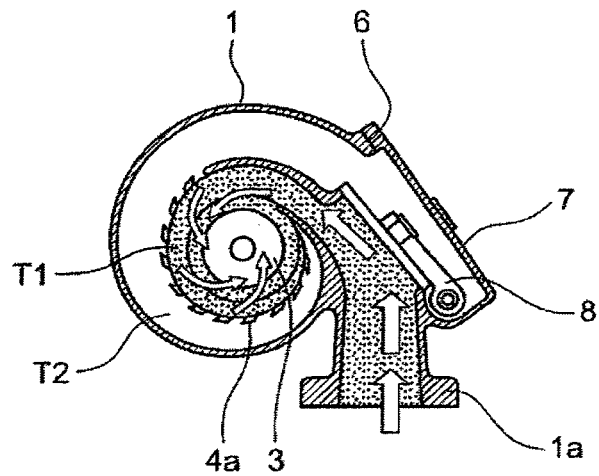
FIG. 9(A) shows the inner configuration regarding the turbine housing of the conventional turbocharger, and explains the exhaust gas flow in the turbine housing when the engine is operated under a low speed operation condition.
Figure 9B:
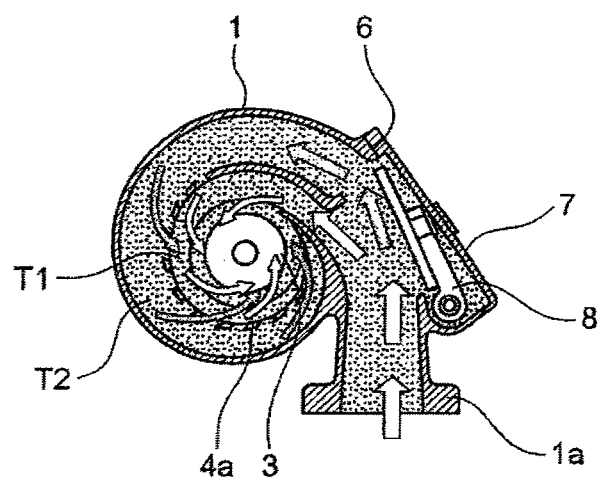
FIG. 9(B) shows the inner configuration regarding the turbine housing of the conventional turbocharger, and explains the exhaust gas flow in the turbine housing when the engine is operated under a high speed operation condition.

FIG. 8 depicts a general example regarding conventional exhaust gas turbochargers of a variable capacity type; thereby, FIG. 8 shows a bird' eye view regarding the variable capacity exhaust gas turbocharger of a conventional type, the turbocharger being depicted by use of an exploded view.

As shown in FIG. 8, the turbocharger is provided with: a turbine housing 1; a bearing housing unit 5 coupled to the turbine housing 1; and, a compressor housing 2 coupled to the bearing housing unit 5. Further, in the space that involves the bearing housing unit 5 and the turbine housing 1, a turbine wheel 3 and a turbine stator 4 are housed; incidentally, a compressor wheel is provided in the compressor housing of the turbocharger in response to the turbine wheel, although the compressor wheel is not shown. An opening is formed on an upper side of the turbine housing 1; a valve cover 7 is fastened to the turbine housing so as to cover the opening with a gasket 6 between the valve cover 7 and the turbine housing; just below the valve cover, a flow rate control valve 8 is arranged inside the turbine housing 1. The turbine housing 1 is provided with a plate type inlet flange 1a that is formed so as to fix the turbine housing 1 to an exhaust gas outlet side of the engine.

(First Embodiment)

Figure 1:
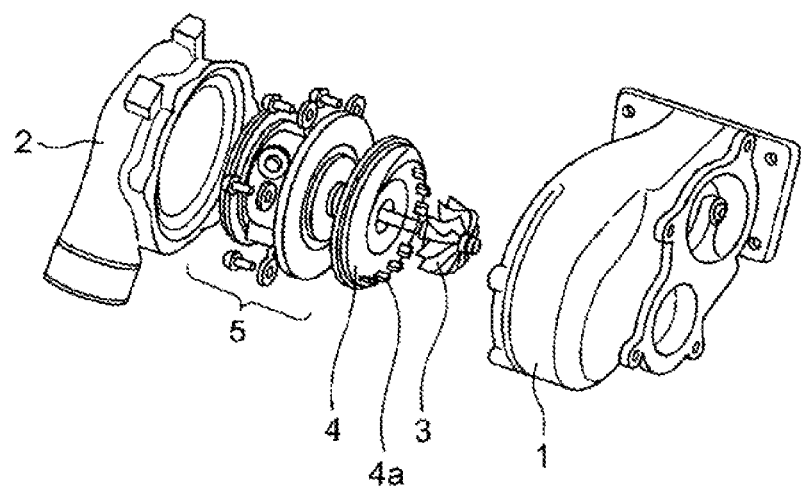
FIG. 1 shows a variable capacity exhaust gas turbocharger according to a first embodiment of the present invention.

FIG. 1 shows a variable capacity exhaust gas turbocharger according to a first embodiment of the present invention.

The variable capacity exhaust gas turbocharger according to the first embodiment comprises: a turbine housing 1 in which the exhaust gas emitted from the internal combustion engine is guided; a turbine wheel 3 provided in the turbine housing 1, the turbine wheel being rotated by the exhaust gas.

Further, the turbocharger further comprises: a bearing housing unit 5 that is coupled to the turbine housing 1; a compressor housing 2 that is coupled to the bearing housing unit 5, the bearing housing unit 5 being arranged so as to be fitted in the inner side of the compressor housing 2.

Further, in the space that involves the bearing housing unit 5 and the turbine housing 1, a turbine wheel 3 and a turbine stator 4 are housed; incidentally, a compressor wheel is provided in the turbocharger in response to the turbine wheel, although the compressor wheel is not shown. In addition, in this embodiment, the turbine housing 1 is made of metal sheets; thus, the heat capacity (heat accumulation capacity) can be restrained.

Figure 2:
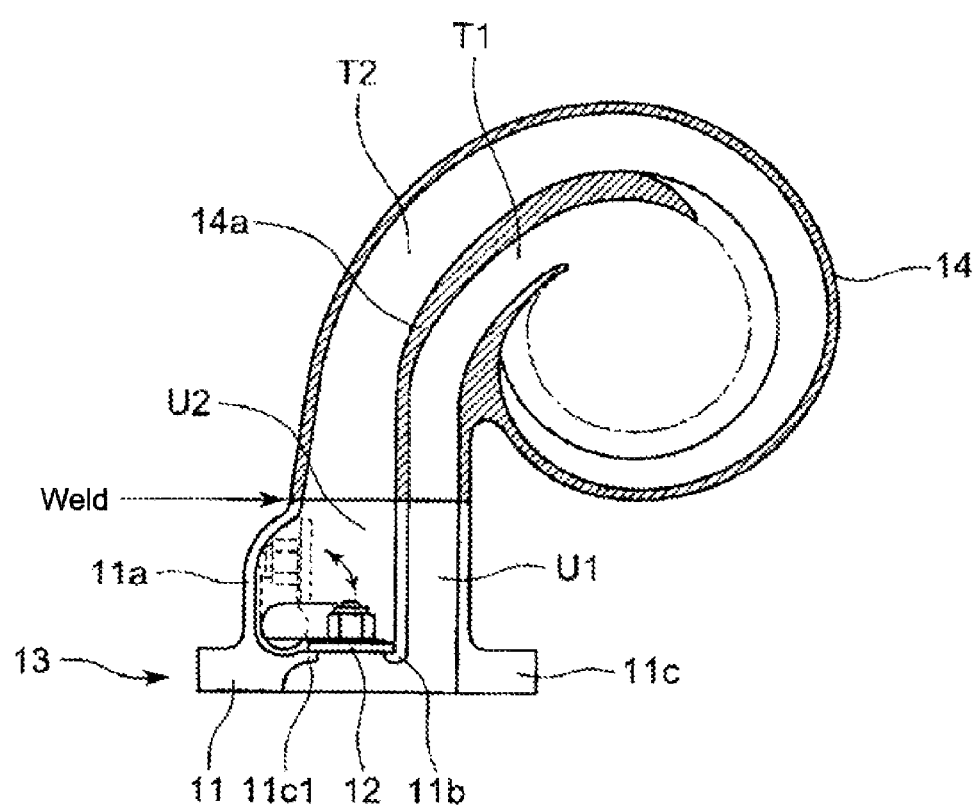
FIG. 2 shows the inner configuration regarding the turbine housing of the turbocharger depicted in FIG. 1.

FIG. 2 shows the inner configuration regarding the turbine housing of the turbocharger, so as to focus on the remarkable feature of the present invention. As shown in FIG. 2, inside of the turbocharger turbine housing 1, an inner scroll passage T1 and an outer scroll passage T2 are formed; namely, the exhaust gas flow space inside the turbine housing is demarcated into the inner scroll passage T1 and the outer scroll passage T2; thereby, the exhaust gas that rotationally drives the turbine wheel after passing through the scroll passages (through the inner scroll passage or through both the inner and outer scroll passages). Further, in the turbine housing, a flap valve 12 is provided so that the flap valve 12 controls the ratio between the gas flow rate of the exhaust gas that enters the inner scroll passage T1 and the gas flow rate of the exhaust gas that enters the inner scroll passage T1. In addition, the turbine housing 1 is provided with an exhaust gas inlet hardware 13 at the gas inlet side of a turbine housing body 14; thereby, the exhaust gas inlet hardware 13 includes: an exhaust gas inlet body 11 comprising an inner side flow passage U1 that communicates with the inner scroll passage T1, and an outer side flow passage U2 that communicates with the outer scroll passage T2; and, the flap valve 12 that opens and closes the outer side flow passage U2.

In this embodiment, the turbine housing comprises the turbine housing body 14, and the exhaust gas inlet hardware 13 that is formed as a separated body different from the turbine housing body 14; and, the exhaust gas inlet hardware 13 can be fixed to the turbine housing body 14, for example, by means of welding, after the flap valve 12 and an arm member 15 connected to the flap valve 12 are easily assembled to the exhaust gas inlet hardware 13.

Further, the exhaust gas inlet body 11 comprises: a valve recess (space) 11a that makes the flap valve take shelter so that the outer side flow passage U2 forms a smooth flow passage when the flap valve is opened; a seat 11b on which the flap valve sit when the flap valve is closed so as to shut the outer side flow passage U2.

Further, on the exhaust gas inlet side of the turbine housing body 14, a gas inlet side plate 11c that forms a plate type inlet flange is provided so as to fix the turbine housing 1 to an exhaust gas outlet side of the engine; on the exhaust gas passage wall at the inner periphery side of the gas inlet side plate 11c, a second seat 11c1 is formed so that the flap valve 12 sits on the second seat. Therefore, the second seat can supply satisfactory strength durability against the seating impacts of the flap valve 12, even though the flap valve repeats opening/closing movements for long operation hours. In addition, the exhaust gas flow passing through the outer scroll passage T2 can be further accurately shut.

Figure 3:
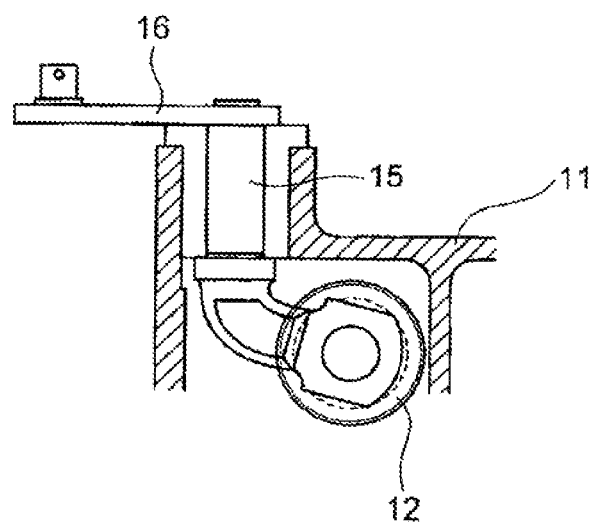
FIG. 3 shows the movement mechanism (open/close mechanism) regarding the flap valve of the turbine housing depicted in FIG. 2.

As shown in FIG. 2, the rotation center of the flap valve 12 is placed in the housing space of the valve recess 11a; around the rotation center, the flap valve 12 rotationally moves between a position (the solid line for the valve 12 in FIG. 2) where the flap valve 12 keeps contact with the seat 11b and a position (the dotted line for the valve 12 in FIG. 2) where the flap valve 12 is housed in the space of the valve recess 11a. As shown in FIG. 3, the flap valve 12 of, for example, a disk shape rotationally moves by the driving movements via an arm member 15 and a lever member 16.

Further, as shown in FIG. 2, since the flap valve 12 has surface contact with the seat 11b when the flap valve sits on the seat, the sealing effect during the valve closing duration is enhanced; thereby, the exhaust gas is prevented from streaming through the outer scroll passage T2. Accordingly, the deterioration of the turbine performance is restrained while the flap valve sits on the seat.

In addition, since the seat 11b is grinded (e.g. polished), the performance of the sealing between the valve 12 and the seat 11b can be enhanced.

Further, when the engine is operated under a low speed operation condition, the exhaust gas enters the gas inlet side plate 11c and streams along the inner scroll passage T1 that forms a spiral shape passage; thereby, the streamlines of the exhaust gas flow along the inner scroll passage are directed toward the inner side of the spiral scroll. The inner scroll passage T1 and the outer scroll passage T2 are demarcated by a partition wall 14a; on the downstream side from the trailing edge of the partition wall 14a, a plurality of blades 4a of the turbine stator 4 that is shown in FIG. 1 (not shown in FIG. 2) are arranged; the upstream side of each blade forms a comparatively mild slope (e.g. angle of attack), while the downstream side of the blade forms a comparatively steep slope. Further, each blade is arranged so as to have a predetermined inclined angle against the hoop direction, the hoop crossing each blade; since the stream lines of the exhaust gas flow along the inner scroll passage are directed toward the inner side of the spiral scroll, the exhaust gas flow in the inner scroll passage T1 does not enter the outer scroll passage T2.

On the other hand, when the engine is operated under a high-speed operation condition, the flap valve 12 rotationally moves toward the space of the valve recess 11a as shown in FIG. 2; thus, the exhaust gas that enters the gas inlet side plate 11c streams along the inner scroll passage T1 as well as the outer scroll passage T2. The exhaust gas that enters the inner scroll passage T1 streams along the inner scroll passage T1, the streamlines being directed toward the inner side of the spiral scroll. On the other hand, the exhaust gas that enters the outer scroll passage T2 streams along the spiral of the outer scroll passage T2; and, the exhaust gas streams into the inner scroll passage through the throat area (or slit area) between a blade 4a of the turbine stator and an adjacent blade; thus, the exhaust gas flow in the outer scroll passage joins the exhaust gas flow in the inner scroll passage. After the merging gas flow streams through the turbine wheel, the exhaust gas is discharged outside of the turbine housing 1.

According to this first embodiment, the rotation center of the flap valve 12 is placed in the housing space of the valve recess 11a; around the rotation center, the flap valve 12 rotationally moves between a position where the flap valve 12 keeps contact with the seat 11b and a position where the flap valve 12 is housed in the space of the valve recess 11a; thus, the conventionally used valve cover can be dispensed with; accordingly, there can be no apprehension of gas leakage through the sealing surface of the valve cover; moreover, the configuration of the turbine housing assembly can be simplified and made compact, and the heat capacity of the components that form the turbine housing assembly can be reduced. Consequently, the time span during which the catalyst of the exhaust gas purifying device is activated is shortened. Further, the flap valve 12 is folded into the space of the valve recess 11a, together with the arm member 15 that is connected to the flap valve 12; thus, the flap valve does not hinder the exhaust gas flow. Accordingly, the pressure drop loss regarding the exhaust gas flow can be restrained, and the turbine efficiency can be enhanced. Still further, since the components such as the valve cover, the gasket and the fitting bolts thereof can be dispensed with, the manufacturing cost can be reduced.

(Second Embodiment)

Figure 4:
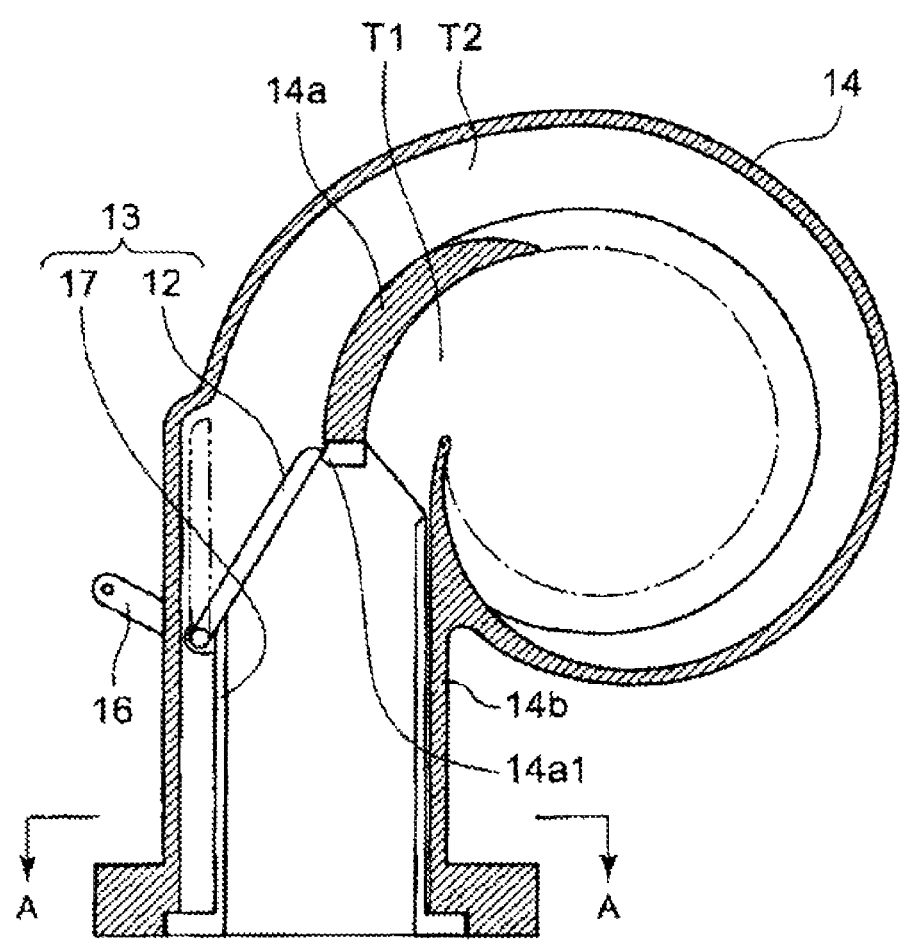
FIG. 4 shows the inner configuration of a variable capacity exhaust gas turbocharger according to a second embodiment of the present invention.

FIG. 4 shows the inner configuration of a variable capacity exhaust gas turbocharger according to a second embodiment of the present invention; incidentally, the same component in this second embodiment as in the first embodiment is quoted with a common alphanumeric, and the explanation repetition will be omitted.

As shown in FIG. 4, an exhaust gas inlet hardware 13 is provided at the inlet of a turbine housing body 14 in which an inner scroll passage T1 and an outer scroll passage T2 are demarcated by a partition wall 14a; thereby, the exhaust gas inlet hardware 13 comprises: an exhaust gas inlet duct 17 through which the exhaust gas streams; and a flap valve 12 that is provided in the exhaust gas inlet duct 17. The exhaust gas inlet duct 17 is formed, being made of metal sheets; and, a duct part as the gas inlet part of the turbine housing surrounds the exhaust gas inlet duct 17. Thus, the exhaust gas inlet duct 17 and the gas inlet part of the turbine housing form a double tube structure; accordingly, the heat to be transmitted to the turbine housing is reduced, and the temperature of the exhaust gas is kept high. As a result, the time span during which the catalyst of the exhaust gas purifying-device becomes activated can be shortened.

Further, at an end part of the gas inlet side regarding the partition wall 14a, a seat 14a1 is formed so that the flap valve 12 sits on the seat 14a1, the flap valve having surface contact with the seat 14a1. Thanks to the surface contact, the performance of the sealing between the flap valve 12 and the seat 14a1 can be enhanced.

According to this embodiment, the flap valve 12 rotationally moves between a position where the flap valve 12 sits on the seat 14a1 of the partition wall 14a and a position where the flap valve 12 is placed along the gas flow direction.

Figure 5:
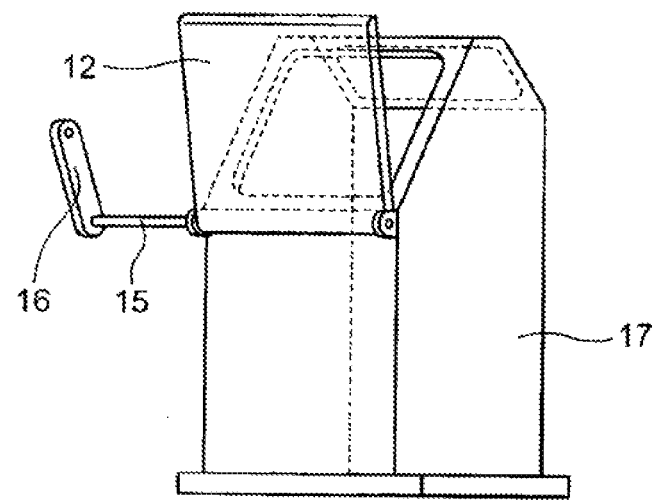
FIG. 5 shows the movement mechanism (open/close mechanism) regarding the flap valve of the turbine housing depicted in FIG. 4.

As illustratively shown in FIG. 5, the flap valve 12 opens and closes by the movements of the arm member and the lever member 16. In this embodiment, a rectangular platy member forms the flap valve 12.

Figure 6:
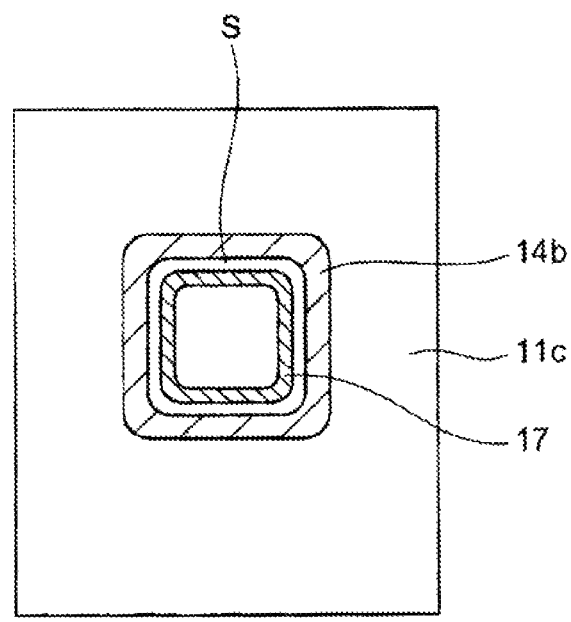
FIG. 6 shows A-A arrow view in FIG. 4.

Further, as shown in FIG. 6, in this embodiment, the exhaust gas inlet duct 17 is inserted in a duct part (an outer duct 14b) as a gas inlet part of the turbine housing, so that the double tube structure is formed. Hereby, the exhaust gas can stream just inside the exhaust gas inlet duct 17 as the inner side duct of the double tube structure; thus, an airspace S can be formed between the outer duct 14b and the exhaust gas inlet duct 17 as an inner duct. Thanks to the airspace S, excellent heat insulation can be achieved, namely, heat dissipation transmitted to the turbine housing can be reduced; the temperature of the exhaust gas can be kept high; and, the time span during which the catalyst of the exhaust gas purifying-device becomes activated can be shortened.

In this second embodiment, since the flap valve 12 rotationally moves between a position where the flap valve 12 sits on the seat 14a1 of the partition wall 14a and a position where the flap valve 12 is placed along the gas flow direction, the conventionally used valve cover can be dispensed with; accordingly, there can be no apprehension of gas leakage through the sealing surface of the valve cover; moreover, the configuration of the turbine housing assembly can be simplified and made compact, and the heat capacity of the components that form the turbine housing assembly can be reduced. Consequently, the time span during which the catalyst of the exhaust gas purifying device is activated is shortened. Further, when the engine is operated under a high speed operation condition and the exhaust gas is made stream through the outer scroll passage T2, the flap valve 12 is placed along the gas flow direction; thus, the flap valve does not hinder the exhaust gas flow. More in detail, when the flap valve 12 is placed along the gas flow direction, the flap valve 12 moves into a space outside of an area that is formed by the extension of the exhaust gas inlet duct 17 so that the flap valve does not hinder the exhaust gas flow. Accordingly, the pressure drop loss regarding the exhaust gas flow can be restrained, and the turbine efficiency can be enhanced. Still further, since the components such as the valve cover, the gasket and the fitting bolts thereof can be dispensed with, the manufacturing cost can be reduced.

(Third Embodiment)

Figure 7:
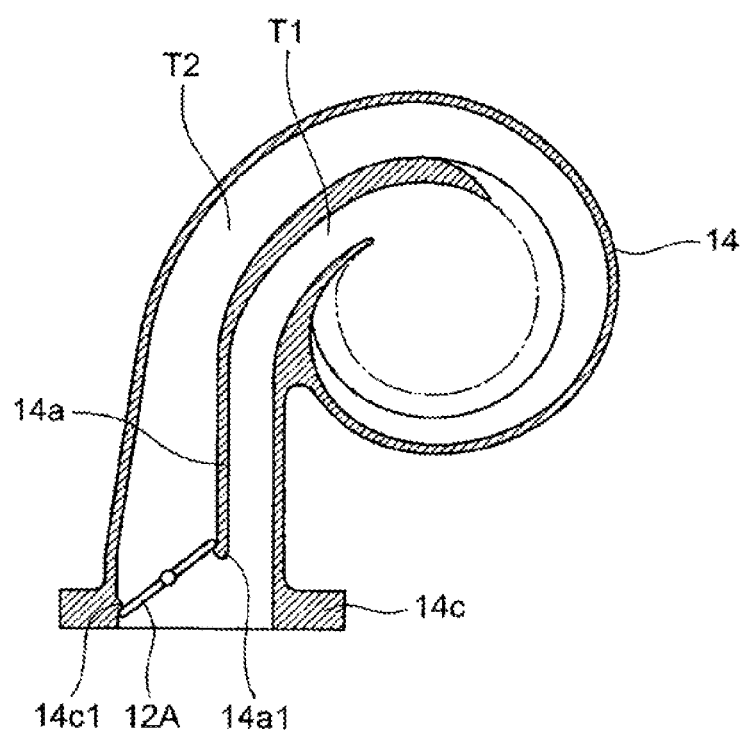
FIG. 7 shows the inner configuration of a variable capacity exhaust gas turbocharger according to a third embodiment of the present invention.

FIG. 7 shows the inner configuration of a variable capacity exhaust gas turbocharger according to a third embodiment of the present invention; incidentally, the same component in this third embodiment as in the first embodiment is quoted with a common alphanumeric, and the explanation repetition will be omitted.

As shown in FIG. 7, a butterfly valve 12A is provided at the exhaust gas inlet part of the turbine housing body 14 inside which an inner scroll passage T1 and an outer scroll passage T2 are formed; a partition wall 14a is provided in the exhaust gas inlet part of the turbine housing body 14 so that the inner scroll passage T1 and the outer scroll passage T2 are demarcated. At an end part of the gas inlet side regarding the partition wall 14a, a seat 14a1 is formed so that the butterfly valve 12A sits on the seat 14a1. Further, a flange 14c is formed at the exhaust gas inlet part of the turbine housing body 14; on the exhaust gas passage wall at the inner periphery side of the flange 14c, a second seat 14c1 is formed so that the butterfly valve 12A sits on the second seat 14c1. Therefore, the second seat 14c1 can supply satisfactory strength durability against the seating impacts of the butterfly valve 12A, even though the butterfly valve 12A repeats opening/closing movements for long operation hours. In addition, the exhaust gas flow passing through the outer scroll passage T2 can be further accurately shut.

The butterfly valve 12A rotationally moves between a position where the butterfly valve 12A sits on the seats 14a1 and 14c1, and a position where the butterfly valve 12A is placed along the gas flow direction.

Further, the butterfly valve 12A is designed so that the butterfly valve 12A can be installed from the gas inlet side of the turbine housing 1; hence, the butterfly valve can be easily assembled in the turbine housing; thus, TACT time (e.g. inspection time) or manufacturing cost can be reduced.

When the butterfly valve 12A sits on the seat 14a1, the butterfly valve 12A slopes so that the exhaust gas smoothly streams into the inner scroll passage T1; thus, the pressure drop loss regarding the exhaust gas flow can be restrained.

Further, since the butterfly valve 12A has surface contact with the seats 14a1 and 14c1, the sealing effect during the valve closing duration is enhanced; thereby, the exhaust gas is prevented from streaming through the outer scroll passage T2.

In this third embodiment, the butterfly valve 12A rotationally moves between a position where the butterfly valve 12A sits on the seats 14a1 and 14c1, and a position where the butterfly valve 12A is placed along the gas flow direction; thus, the conventionally used valve cover can be dispensed with; accordingly, there can be no apprehension of gas leakage through the sealing surface of the valve cover; moreover, the configuration of the turbine housing assembly can be simplified and made compact, and the heat capacity of the components that form the turbine housing assembly can be reduced. Consequently, the time span during which the catalyst of the exhaust gas purifying device becomes activated is shortened.

Further, since the butterfly valve 12A can be placed along the gas flow direction so that the butterfly valve 12A does not hinder the exhaust gas flow, the pressure drop loss regarding the exhaust gas flow can be restrained, and the turbine efficiency can be enhanced. Still further, since the components such as the valve cover, the gasket and the fitting bolts thereof can be dispensed with, the manufacturing cost can be reduced.

Incidentally, the present invention shall not be construed as limiting the scope thereof to the embodiments as is described thus far; it is needless to say that there can be various kinds of modified embodiments within the bounds of the features of the present invention.

Industrial Applicability

According to the present invention, a variable capacity exhaust gas turbocharger can be provided; thereby, the heat capacity, namely, the heat absorption accumulated on the turbine side of the turbocharger can be restrained; and, the configuration of the turbocharger can be simplified. The configuration according to the features of the present invention can be applied to the products in the technical field of turbochargers.

The invention claimed is:

1. A variable capacity exhaust gas turbocharger comprising:
   a turbine housing in which exhaust gas emitted from an internal combustion engine is guided;
   a turbine wheel provided in the turbine housing, the turbine wheel being rotated by the exhaust gas;
   an inner scroll passage and an outer scroll passage formed in the turbine housing for dividing a flow of the exhaust gas for rotating the turbine wheel into an inner flow and an outer flow;
   a flow rate control valve provided in the turbine housing for controlling a flow rate of the exhaust gas that enters the inner scroll passage and a flow rate of the exhaust gas that enters the outer scroll passage; and
   a compressor housing connected to the turbine housing via a bearing housing unit;
   wherein the flow rate control valve is a flap valve, and
   the variable capacity exhaust gas turbocharger further comprises:
   an exhaust gas inlet component provided at an exhaust gas inlet part of a turbine housing body inside of which the inner scroll passage and the outer scroll passage are formed, the exhaust gas inlet component comprising:
      an exhaust gas inlet duct into which the exhaust gas streams; and
      the flap valve provided to the exhaust gas inlet duct;
   wherein the gas inlet side of the turbine housing body is provided with a partition wall for separating between the inner scroll passage and the outer scroll passage,
   a seat on which the flap valve sits is formed on an end part of the partition wall at the side of the exhaust gas inlet part, and
   the flap valve rotationally moves between a position where the flap valve is in contact with the seat and a position where the flap valve is placed along the gas flow direction,
   further wherein when the flap valve is placed along the gas flow direction, the flap valve moves into a space outside of an area that is formed by the extension of the exhaust gas inlet duct so that the flap valve does not hinder the exhaust gas flow, and
   wherein the exhaust gas inlet duct is inserted in an exhaust gas inlet part of the turbine housing body, thereby forming a double tube structure.

2. The variable capacity exhaust gas turbocharger according to claim 1, wherein the exhaust gas inlet duct is made of metal sheets.

3. The variable capacity exhaust gas turbocharger according to claim 1, wherein the flap valve has surface contact with the seat located on the partition wall when the flap valve sits on the seat.

4. A variable capacity exhaust gas turbocharger comprising:
   a turbine housing in which exhaust gas emitted from an internal combustion engine is guided;
   a turbine wheel provided in the turbine housing, the turbine wheel being rotated by the exhaust gas;
   an inner scroll passage and an outer scroll passage formed in the turbine housing for dividing a flow of the exhaust gas for rotating the turbine wheel into an inner flow and an outer flow;
   a flow rate control valve provided in the turbine housing for controlling a flow rate of the exhaust gas that enters the inner scroll passage and a flow rate of the exhaust gas that enters the outer scroll passage; and
   a compressor housing connected to the turbine housing via a bearing housing unit;
   wherein the flow rate control valve is a butterfly valve,
   the butterfly valve is provided at the exhaust gas inlet part of the turbine housing body inside of which the inner scroll passage and the outer scroll passage are formed,
   the exhaust gas inlet part of the turbine housing body is provided with a partition wall for separating between the inner scroll passage and the outer scroll passage,
   a seat on which the butterfly valve sits is formed on an end part of the partition wall at the side of the exhaust gas inlet part, and
   the butterfly valve rotationally moves between a position where the butterfly valve sits on the seat and a position where the butterfly valve is placed along the gas flow direction,
   wherein the variable capacity exhaust gas turbocharger further comprising
   a flange part formed at the exhaust gas inlet part of the turbine housing body; and
   a second seat for the butterfly valve to sit thereon is formed at an inner periphery side of the flange part on an exhaust gas passage inner-wall of the exhaust gas inlet part of the turbine housing body.

5. The variable capacity exhaust gas turbocharger according to claim 4, wherein the butterfly valve is configured to be installed from the exhaust gas inlet part of the turbine housing body.

6. The variable capacity exhaust gas turbocharger according to claim 5, wherein
   the butterfly valve slopes so that the exhaust gas smoothly streams into the inner scroll passage when the butterfly valve sits on the seat on the partition wall.

7. The variable capacity exhaust gas turbocharger according to claim 4, wherein the butterfly valve has surface contact with the seat located on the partition wall when the butterfly valve sits on the seat.

* * * * *